(12) United States Patent
Day

(10) Patent No.: US 9,674,041 B2
(45) Date of Patent: Jun. 6, 2017

(54) MULTIPLEXING AND CONGESTION CONTROL

(75) Inventor: John D. Day, Foxboro, MA (US)

(73) Assignee: TRIA NETWORK SYSTEMS, LLC, Harvard, IL (US)

( * ) Notice: Subject to any disclaimer, the term of this patent is extended or adjusted under 35 U.S.C. 154(b) by 429 days.

(21) Appl. No.: 13/469,131

(22) Filed: May 11, 2012

(65) Prior Publication Data

US 2012/0281535 A1 Nov. 8, 2012

Related U.S. Application Data

(63) Continuation of application No. 10/546,066, filed as application No. PCT/US2004/006955 on Sep. 15, 2008, now Pat. No. 8,180,918.

(60) Provisional application No. 60/452,812, filed on Mar. 7, 2003.

(51) Int. Cl.
G06F 15/16 (2006.01)
H04L 12/24 (2006.01)

(52) U.S. Cl.
CPC ......... *H04L 41/0896* (2013.01); *H04L 41/147* (2013.01); *H04L 41/5025* (2013.01)

(58) Field of Classification Search
CPC . H04L 41/0896; H04L 41/147; H04L 41/5025
USPC ....................................................... 709/235
See application file for complete search history.

(56) References Cited

U.S. PATENT DOCUMENTS

| | | | |
|---|---|---|---|
| 5,566,175 A | 10/1996 | Davis | |
| 5,953,344 A | 9/1999 | Dail | |
| 6,072,773 A | 6/2000 | Fichou | |
| 6,072,800 A | 6/2000 | Lee | |
| 6,092,096 A | 7/2000 | Lewis | |
| 6,094,420 A * | 7/2000 | Lemieux | 370/232 |
| 6,405,257 B1 | 6/2002 | Gersht | |
| 6,502,131 B1 | 12/2002 | Vaid | |
| 6,526,259 B1 | 2/2003 | Ho | |
| 6,728,267 B1 | 4/2004 | Giese | |
| 7,139,242 B2 | 11/2006 | Bays et al. | |
| 7,139,692 B2 | 11/2006 | Cohen et al. | |
| 7,383,321 B2 | 6/2008 | Moyer | |
| 7,519,370 B2 | 4/2009 | Febvre et al. | |
| 8,000,724 B1 | 8/2011 | Rayburn et al. | |
| 2002/0054567 A1* | 5/2002 | Fan | 370/230 |
| 2002/0073224 A1* | 6/2002 | Varma et al. | 709/233 |
| 2002/0114466 A1 | 8/2002 | Tanaka et al. | |
| 2002/0172207 A1 | 11/2002 | Saito | |
| 2003/0014623 A1 | 1/2003 | Freed | |
| 2003/0097461 A1* | 5/2003 | Barham et al. | 709/235 |
| 2005/0188099 A1* | 8/2005 | Patel | 709/236 |
| 2016/0156587 A1 | 6/2016 | Day | |

OTHER PUBLICATIONS

Chong et al.Probabilistic Burstiness-Curve-Based Connection Control for Real-Time Multimedia Services in ATM Networks. 1997. IEEE. pp. 1072-1086.*

(Continued)

*Primary Examiner* — Bryan Lee
(74) *Attorney, Agent, or Firm* — Guntin & Gust, PLC; Jay H. Anderson

(57) ABSTRACT

Methods, systems and devices for network congestion control exploit the inherent burstiness of network traffic, using a wave-based characterization of network traffic and corresponding multiplexing methods and approaches.

18 Claims, 19 Drawing Sheets

(56) References Cited

OTHER PUBLICATIONS

Fu et al. Aggregation and Scalable QoS: A Performance Study. 2001. Department of Electrical and Computer Engineering Rice University. pp. 307-324.*
Chong, "Probabilistic Burstiness-Curve-Based Connection Control for Real-Time Multimedia Services in ATM Networks", IEEE Journal on Selected Areas in Communications, vol. 15, No. 6, Aug. 1997.
Fu, "Aggregation and Scalable QoS: A Performance Study", Springer-Verlag Berling Heidelberg 2001.
Luby, "Wave and Equation Based Rate Control Using Multicast Round Trip Time", SigComm '02, Aug. 19-23, 2002.

* cited by examiner

Figure 6. Typical Burst Pattern for a Telnet Session
(as seen by the user side or router on the path)

Figure 7 Typical Burst Pattern for a File Transfer
(as send at the user side)

Figure 8. A voice Application would generate PDUs at precise intervals

Figure 10. Probability Wave for a Typical Telnet Connection

Figure 11. Probability Wave for a Typical FTP

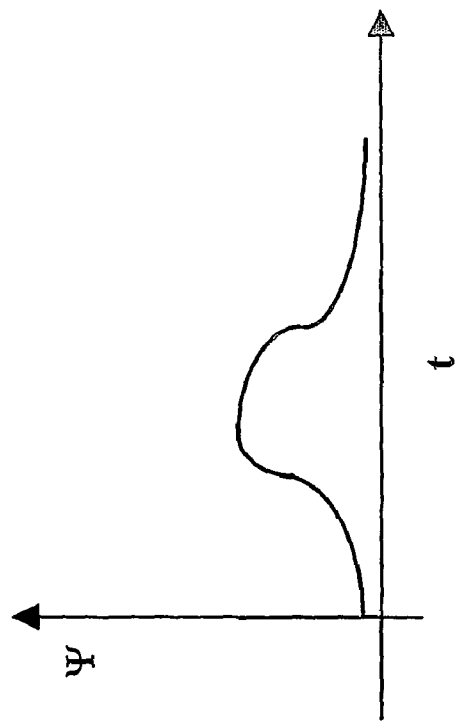
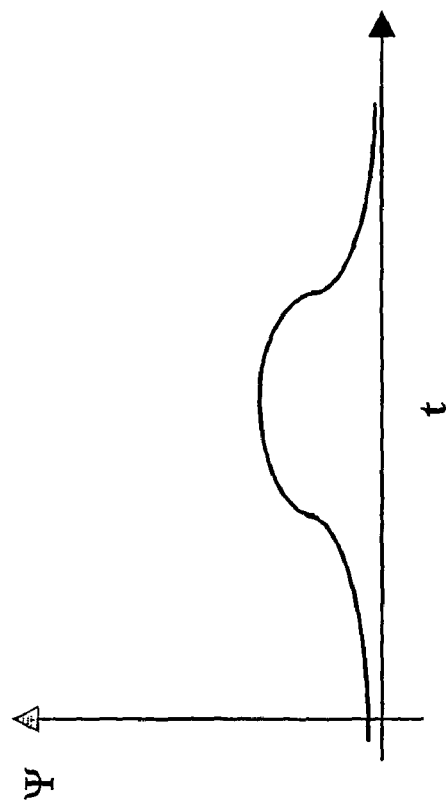
FIG. 12

Figure 13. Probability Wave for a Typical Voice Connection

Figure 14. When a wave is multiplexed to a lower layer with twice the bandwidth, it compresses the wave without altering the wavelength.

MULTIPLEXING AND CONGESTION CONTROL

CROSS-REFERENCE TO RELATED APPLICATIONS

This application is a continuation of U.S. patent application Ser. No. 10/546,066 having a 371(c) date of Sep. 15, 2008 (filed Aug. 18, 2005 and now U.S. Pat. No. 8,180,918), which is a national stage filing under 35 U.S.C. 371 of PCT Application PCT/US04/06955 filed Mar. 5, 2004, which claims the priority of U.S. provisional application No. 60/452,812 filed Mar. 7, 2003, the disclosures of U.S. patent application Ser. No. 10/546,066 and U.S. Provisional Application No. 60/452,812 are incorporated herein by reference.

FIELD OF THE DISCLOSURE

The present invention relates generally to digital networks, and in particular, to methods, systems and devices for multiplexing traffic in a network so as to control congestion.

BACKGROUND OF THE DISCLOSURE

In patents and academic literature relating to data networks, there is a considerable literature on congestion control. Thousands of academic papers have been written on the subject and numerous patents have been issued. A major characteristic of network traffic is that it is bursty. However, traditional analytical techniques have been developed from telephony assume a continuous stream. Further, the mathematics of queuing theory was only tractable for Poisson distributions, so much effort was made assuming traffic was Poisson (which it isn't) or changing the traffic pattern to be Poisson so that the mathematics could be applied. None of these have led to satisfactory solutions.

Prior art suffers from two significant limitations: (1) it attempts to solve the problem by creating special cases; and/or 2) either there is a rigid mapping to mechanism (i.e. connection-like) or it is left as an exercise to the implementer to translate the desired Quality of Service (QoS) characteristics into reality. This renders it difficult to secure agreement across providers.

In general, the classes of QoS that prior art schemes recognize are based on specific current applications, e.g. voice, web, mail, and the like. This, in turn, presents at least two problems: First, each is a special case. If a new application comes along, the mechanism must be modified to accommodate it. Special cases have a tendency to proliferate. New ones are going to meet with considerable resistance. Secondly, it fails to take into account the real properties of the network. One needs an approach that is more comprehensive and less tied to the specific characteristics of current applications.

Recently, there has been much interest in the observation that traffic exhibits self-similarity. While there is not complete consensus as yet, it does appear that the self-similarity of traffic is an artifact of flow control. With large numbers of connections each with flow control responding to different points of congestion along its path and different (and varying) amounts of buffering at the ends would create such chaotic burstiness as to appear to be self-similar.

This is reinforced by observations that measures of the self-similarity of traffic indicate that TCP traffic is more strongly self-similar than UDP traffic. Since UDP has no flow, control and in fact, no mechanisms that would affect self-similarity, the source of burstiness in UDP traffic reflects the burstiness of the applications themselves. And while all applications are bursty, the nature and degree of their burstiness varies widely, which is reflected in the weaker self-similarity measures. The burstiness of applications that use TCP is more dominated by the pattern imposed by TCP flow control, which makes TCP traffic exhibit greater self-similarity.

However, this avenue of work appears to have primarily descriptive, not prescriptive value. It does not teach what should be done to take advantage of this property to avoid congestion or meet QoS requirements. In fact, it is somewhat fatalistic in that it says that no matter what is done, the traffic will always look the same. So one might conclude that there is nothing to be done. Alternatively, it can also be interpreted as saying that Internet traffic is chaotic.

It would be desirable to provide methods, systems and devices that exploit the nature of network traffic to provide congestion control.

BACKGROUND OF THE DISCLOSURE

The present invention provides methods, systems and devices for network congestion control that overcome the limitations of the prior art. In one aspect, the invention provides such methods, systems and devices that exploit the inherent burstiness of network traffic.

In another aspect, the present invention provides such methods, systems and devices in which as one proceeds closer to the core of the network, the characteristics of the network dominate over the characteristics of the application.

In a further aspect, the invention provides methods of flow control and congestion control based on a new mathematical model for characterizing and accommodating the inherently bursty nature of network traffic, including multiplexing methods and approaches.

BRIEF DESCRIPTION OF THE DRAWINGS

These and other features of the invention are described in detail below and illustrated in the attached drawing figures, as follows:

FIG. 12 shows how a slight delay in a router can be used to "square up" a waveform, in which the graph at left shows the waveform before a router and the graph at the right shows the same waveform after incurring a slight delay in the router.

DETAILED DESCRIPTION OF THE DRAWINGS

Overview

Figure 1:
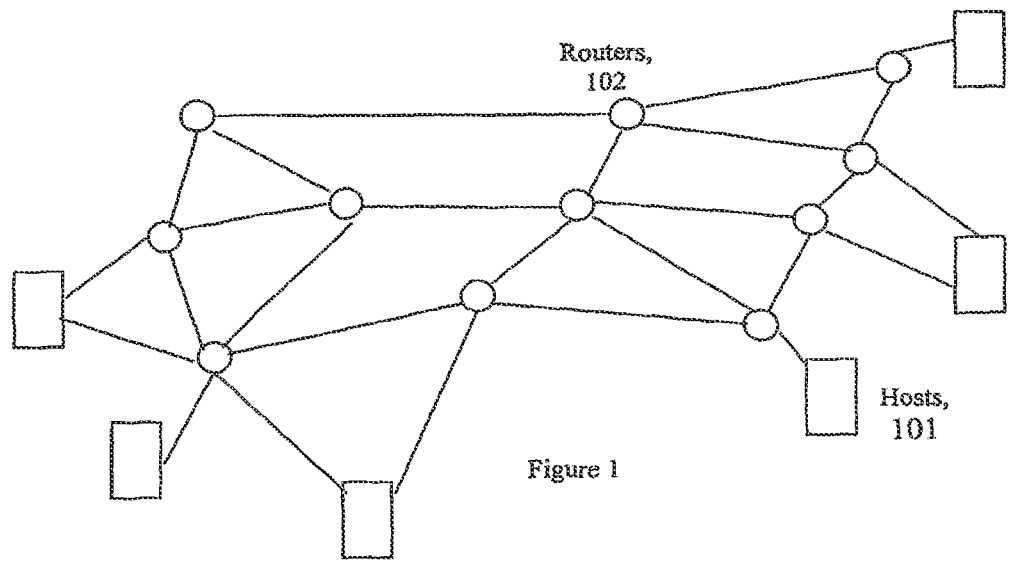
FIG. 1 is a schematic diagram illustrating a typical computer network consisting of routers and interconnecting hosts.

The invention described herein provides methods and systems, which can be implemented in otherwise conventional digital processing networks (whether for data, voice, VoIP, or any other type of information, signals or data), for improving information transfer within and across such networks. Before embarking upon a description of the illustrated embodiments, we first provide an overview of Quality of Service (QoS) and related network issues, which are addressed by the present invention in the context of what can be otherwise conventional digital network environments, like those schematically depicted in FIG. 1 (a schematic diagram of a typical computer network consisting of routers 102 and interconnecting hosts 101 in communication via communications links represented by lines in FIG. 1) and FIG. 2 (a schematic diagram illustrating the conventional layered model of networks with data transfer layers (physical, data link, network and transport layers) and application-related layers (session, presentation and application layers)).

1. QoS Issues

In any conventional network, two significant obstacles to providing QoS are corrupted data and congestion. Providing QoS is at the nexus of three colliding conditions:

the user desires (or even contracts for) a certain QoS, (get as much as possible for as little as possible);

the network is attempting to maximize the utilization (efficiency) of resources (provide as little as possible for as much as possible), but if the network is operated too close to maximal efficiency, the non-deterministic behavior by the user can cause congestion which will degrade QoS.

The QoS requirements of the user are typically a given. The network provider wants the network to be as efficient as possible, so the provider must allow for the unpredictable user. Currently, the answer has been over-provisioning, since bandwidth is relatively inexpensive. And it is cheaper than in the past, but it is unlikely that efficiencies well below 30% will be tolerated forever. Fundamentally, such a solution does not scale and does not lead to stable networks. Much of the problem, then, is how to provide Quality of Service without sacrificing the resiliency and flexibility of connectionless networks. But there are some other problems surrounding QoS.

2. Quality of Service Methods and Systems

The data transfer layers are essentially directed to solving a different problem than the applications. The applications are, in a sense, selfish. They are only concerned (and only have information to be concerned) with their own requirements, trying to acquire as many resources as they can for themselves. In contrast, the data transfer layers are trying to satisfy all of the applications while optimizing the use of resources in the network. Thus, an application tends to act as if it has the whole network to itself. The data transfer layers are much more constrained not only by the demands of the applications but also within the physical constraints of the media that make up the network and the capabilities of the equipment hooking the media together.

2.1. Operating Regions

Assume that the QoS parameters form an n-dimensional space, or hypercube. Generally, one finds in a network that classes of service tend to break along certain "natural" boundaries, essentially cleaving this space into a number of smaller hyper-cubes. This may occur as a result of the range of requirements of applications and the nature of the media and the characteristics of the equipment, e.g. bandwidth will tend to come in increments of X; delay can have a granularity of Y; etc. The ranges of these parameters are referred to herein as "operating regions." For example, bulk transfers might have one range of QoS parameters, while web surfing or VoIP may have different ones. Alternatively, a certain router may only support bandwidth rates up to T1, have limitations on the number of priority levels, amounts of memory in interface cards, or number of queues for traffic classes, etc. These would all contribute to boundaries in the way traffic could be handled and translate into "natural" inflections in the QoS parameter space. There is no requirement that these operating regions cover the QoS space. There may be voids in which there are simply no applications, or areas that cannot occur; although as applications proliferate, one would expect both a greater covering of the QoS space and a finer structure to existing operating regions. We characterize these operating regions in a manner that is independent of both applications and network technology.

Thus, in particular, the term "operating region" is used to denote a volume in a multi-dimensional parameter space provided by a network. In general, applications require certain QoS within certain tolerances. A network can supply service in several operating regions determined by the characteristics of the network. The problem then is to allocate an application to a particular operating region. This approach is independent of specific applications. If the characteristics of the application change, it merely moves in the parameter space, which may cause it to be in a different operating region. If an operating region becomes overpopulated or technology changes make it advantageous to cleave an operating region, this is easily done without impact on the protocols or the applications.

2.2. Multiplexing

Two qualitative changes have occurred almost unnoticed in networking in the last 20 years. First, the characteristics of networks and their traffic moved from the discrete to the continuous. This is the most visible in the treatment of flow control. In early protocol specifications such as NCP, one is struck by how much the specification is concerned with implementation issues, especially buffer management. Before roughly 1980, flow control in data networks was primarily a matter of counting (discrete) buffers. As each buffer was freed, the next protocol data unit (PDU) could be sent. For example, RFNMs in NCP; the sliding window in X.25; rubber EOL in TCP (later removed) and virtually all protocol specifications written during this period discuss the buffer strategies in detail. Many of the protocols proposed and built had fixed window mechanisms, with flow control tightly bound to the acknowledgement of data. This, of course, to some extent reflects the state and cost of technology at the time.

By the early 1980s, network bandwidth, processing power and memory capacity had increased sufficiently that flow control left the world of the discrete and moved to the continuous world of process control. This is reflected most significantly in the adoption of the TCP congestion avoidance scheme. While TCP has a mechanism to support a more "process control"-like flow control policy earlier, it was used more in the vein of the earlier "counting" policies. It was only with the need to address network congestion that it was finally utilized in a process control manner.

Second, networks no longer supported a homogeneous set of applications. The traffic characteristics of some applications became very diverse and could not be considered a single class of traffic. The variety of applications and their requirements had become very heterogeneous. Therefore, it makes a difference what traffic is combined with what. Hence, it leads one to consider the implications of multiplexing.

In conventional networking, for example, it is known that multiplexing can be done for the following two reasons:

1) it is much more expensive to physically connect every node with every other node than it is to physically connect a subset of "neighboring" nodes and allow traffic to share media; and 2) to allow different sources in the same system to share media.

In other words, the primary conventionally-regarded purpose of multiplexing is optimal utilization of the available bandwidth. But if one treats different flows differently, does one combine similar or complementary flows? Can one expect that combining a flow with specific QoS requirements with other flows with very different requirements is not going to degrade the QoS of some flows?

3. Bursty Traffic

In conventional networking, it is known that traffic is bursty There are several reasons for this:

1) Data is generated in packets;

2) Applications tend to generate data in bursts (request/response, pauses while the next block of data is read from secondary storage, etc.), and even if they didn't;

3) The feedback in transport protocol flow control enforces the burstiness;

4) As do the queuing delays in routers.

Figure 3:
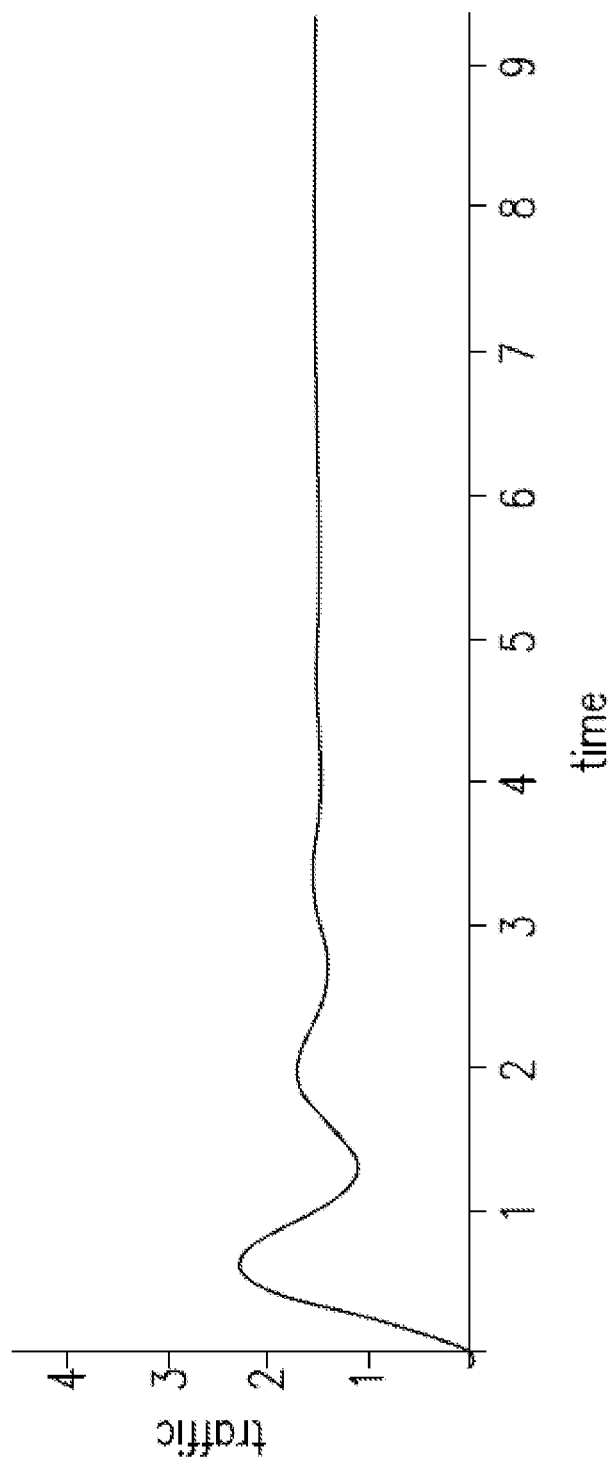
FIG. 3 is a graph that illustrates typical behavior of similar systems, i.e. initial overshoot and converging on a constant flow rate.
Figure 4:
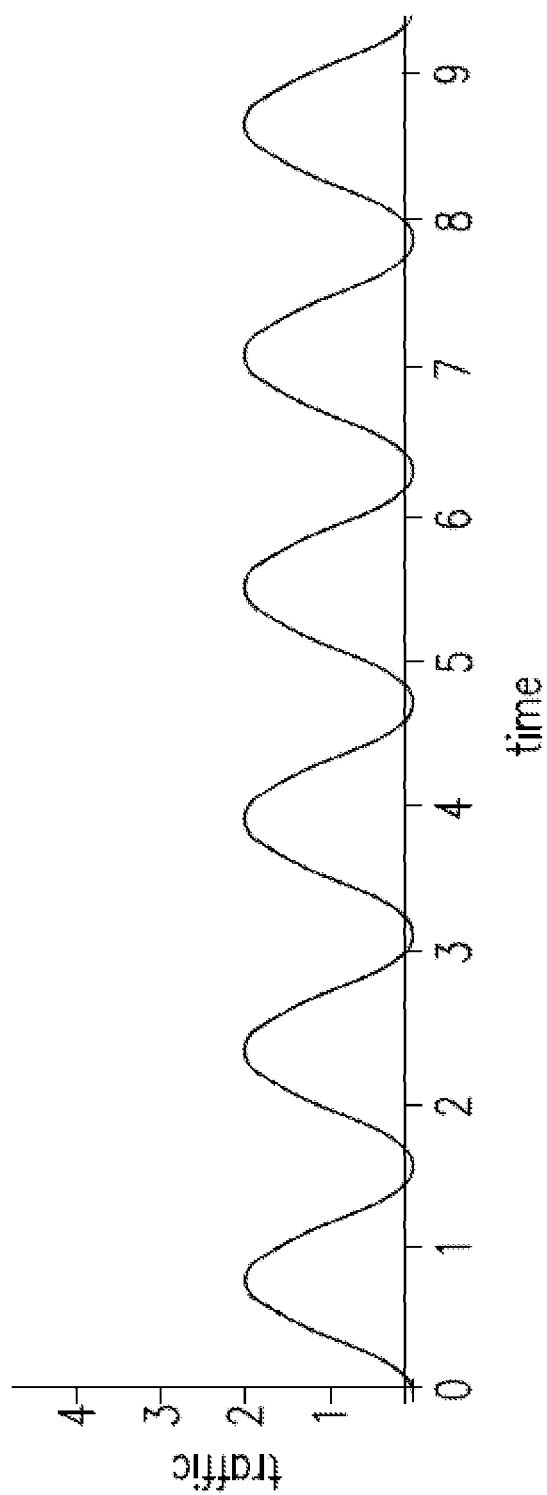
FIG. 4 illustrates that traffic flows are more bursty in nature.

Referring now to FIGS. 3-4, one might expect flow control to modify traffic patterns to behave as shown in the time vs traffic graph of FIG. 3, i.e., a rise and overshoot of the maximum rate the receiver can absorb and then a damping to a stable value. But the effect of transport protocol flow control causes traffic to behave more like the time vs traffic graph of FIG. 4, in which the rate of traffic oscillates regularly.

Figure 5:
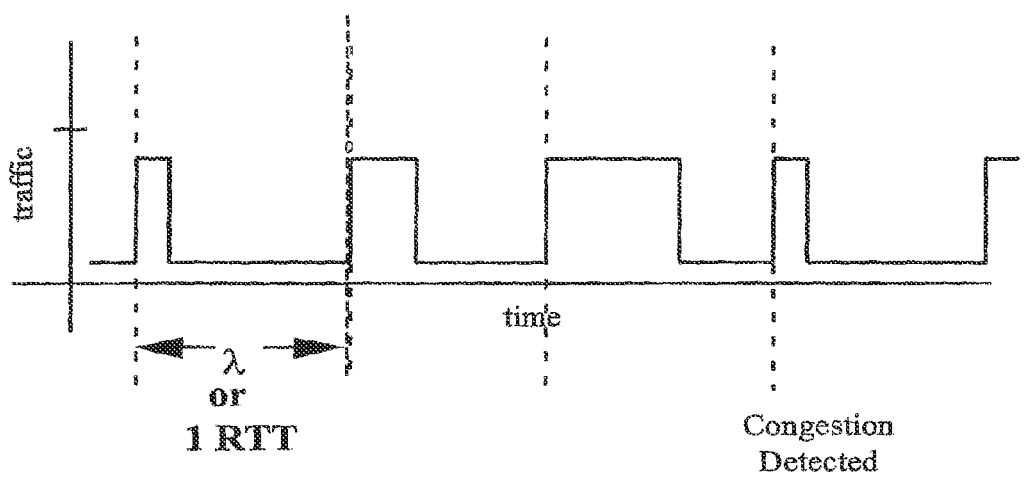
FIG. 5 illustrates the traffic pattern imposed by TCP flow control.

For TCP, in fact, it is actually more complicated than this. Each burst is twice as long as the last until the congestion window is reached and then the burst grows linearly until congestion is detected and then drops back to 1 and starts to grow again, as shown in time vs traffic graph of FIG. 5. Signals, however, by definition contain information (in this case about the conditions encountered by the traffic generated by the application). The present invention is uniquely capable of using this information.

Conventional congestion algorithms, like the leaky bucket algorithm, take this pattern of behavior and turn it into white noise (Poisson). Unfortunately, such conventional methods essentially throw away the best information in favor of congestion control. Not surprisingly, these conventional techniques have had only limited success. What, then, should be done? As the Applicant has discovered, one can use the patterns in the traffic, i.e., the information in the signal, to provide enhanced congestion control.

4. Wave-Based Modeling of Traffic

As noted above, it is well known that traffic is bursty. Accordingly, one aspect of the present invention provides methods that recognize and exploit such burstiness, rather than attempting to mask it.

Figure 6:
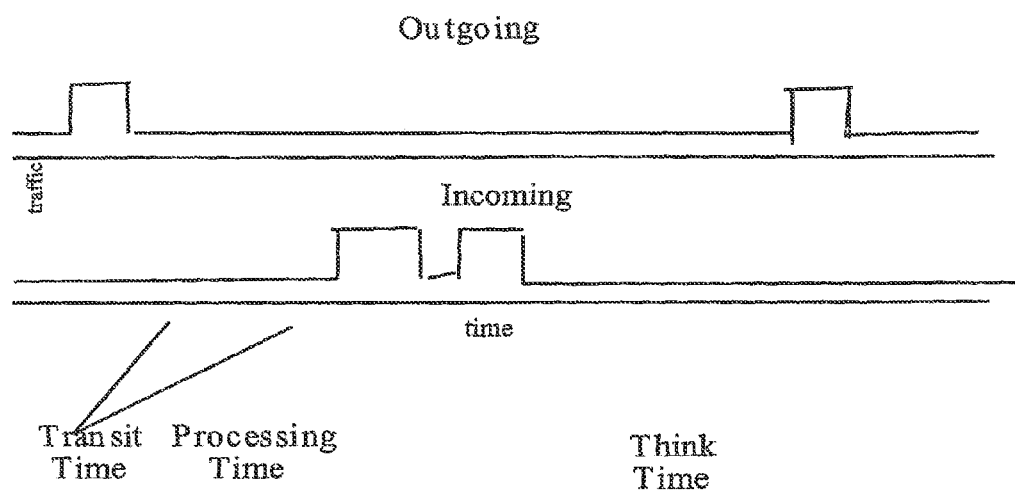
FIG. 6 shows a typical burst pattern for a Telnet Session (as seen by the user side or a router on the path).

In particular, software applications have characteristic burst patterns. For example, a Telnet session has a pattern that can be described as a user sending a short request, waiting for one round trip time plus some time for processing at the remote site to receive on average a longer response. The user then typically thinks over the content of the response for some amount of time before sending another request. Hence, the traffic pattern for a Telnet connection might appear as shown in time vs. traffic plot of FIG. 6 (shown from the user side or from a router along the path).

Clearly, the "think time" may be highly variable, the processing time less variable, and the round trip time less variable yet. This is the type of heavily stochastic traffic that dominated the Internet in its early days.

Figure 7:
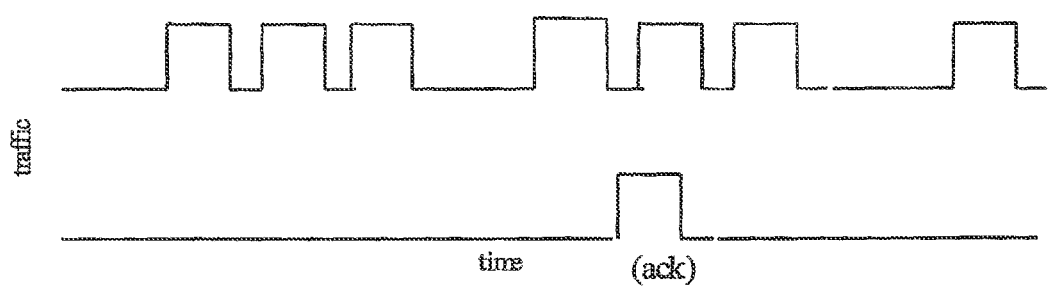
FIG. 7 shows a typical burst pattern for a file transfer (as seen from the user side or a router on the path).

An FTP session, on the other hand, would have a very different pattern, such as that shown in the traffic vs. time graph of FIG. 7. The burst in FIG. 7 is a train of packets that reflects the characteristics of copying data as the operating system (OS) reads blocks from disk, formats them for transmission, sends them, and an ack is returned. Other activity on the sending system can cause small variations in the bursts of traffic and even (although lesser) variations in the intervals between PDUs in a burst, depending on the behavior of the OS.

Figure 8:
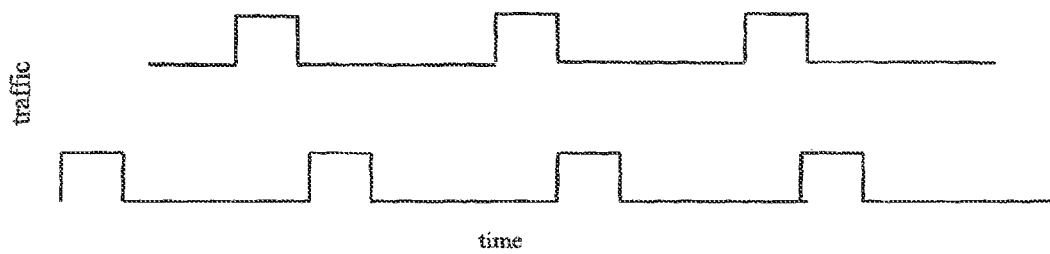
FIG. 8 shows how a voice application would generate protocol data units (PDUs) at regular intervals.

In contrast, a voice application, being isochronous, would exhibit a highly regular pattern of bursts, such as that shown in the traffic vs. time graph of FIG. 8; and so on. Those skilled in the art will appreciate that one could create additional examples of the characteristics of various applications. As a general matter, it suffices to note that some applications generate traffic with reasonable regularity, while others show much less regularity. This rough regularity of application traffic might not appear significant if it were not for the effects of flow control in the Transport Layer.

In particular, in conventional networks, the effect of transport flow control imposes a particular pattern characteristic of the flow control policy, not the application. While most applications generate traffic with sporadic periodicity, the traffic pattern of those applications that generate sufficient traffic will be dominated by the effects of flow control. This results in traffic patterns that exhibit rough, but not particularly strong, periodicity.

In accordance with the invention, the Applicant has discovered that while one cannot expect traffic to be strictly periodic, one can characterize the probability of traffic as being periodic, enabling the use of Fourier series for dealing with such periodicity. As is well known, any periodic waveform can be represented by $$F(t) = \Sigma a_i \cos(\omega_i t + \Phi_i) + b_i \sin(\omega_i t + \Phi_i) \quad (1)$$

If one is considering the probability of data traffic, P(t), then $$P(t) = \text{if } F(t) > 0 \text{ then } |F(t)| \text{ else } 0 \quad (2)$$

Negative values have no meaning in this domain. In accordance with the present invention, from the point of view of an observer in a network like that shown in FIG. 1 (whether the observer is at a source, a destination, or a router/switch in between), one can consider the traffic generated by an application to be a probability wave constructed in the following manner.

Assume that the observer sees a PDU or burst of PDUs of m bits at bandwidth, B. Then it will take m/B secs to send or receive the PDU. (A slightly more complicated characterization is required for a burst of packets.) Now consider each new burst of PDUs as another incident of the same phenomena. One can assume that there is regularity in the bursts and measure the variation in the time between bursts and the time between PDUs. This provides the empirical basis for the probability wave. The probability of a PDU being received can be represented as follows:

The m bits are, in a sense, smeared or spread over $$(m/B + \sigma_1 + \sigma_2) \text{ seconds},$$

where $\sigma_1$ is the variance in the beginning of the burst and $\sigma_2$ is the variance in the end of the burst.

Figure 9:
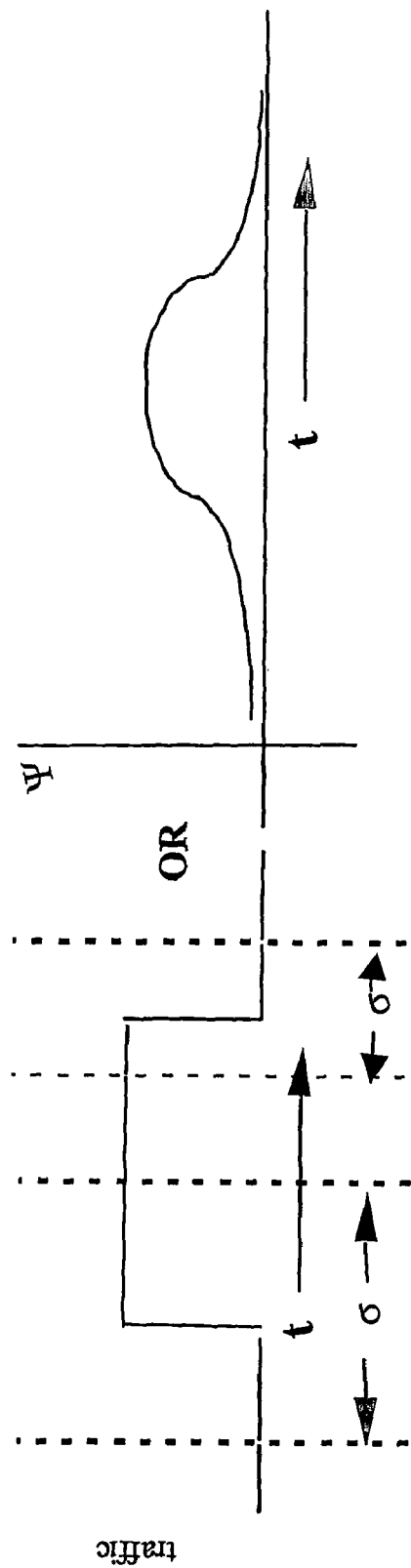
FIG. 9 illustrates how a traffic pattern would be represented as a probability wave where $\Sigma$ is the variance from the start and end of the PDU.

In accordance with the invention, the probability wave can be thought of as a smeared cloud of bits in time that suddenly condense at a specific point when a packet arrives. Much the same will be true for a burst of PDUs. While the variance among bursts will depend on the application and the operating system, the variance of the PDUs other than the first will generally be less. This results in a waveform with a low leading edge, and sharper slope for the trailing edge which is affected more by the variance in the length of the burst than other factors. As such a waveform moves through a network, the queuing delays of the routers and switches will further affect the shape of the waveform. This is illustrated in FIG. 9, which presents a graph of time vs. probability of traffic, in which $\Sigma$ is the variance in the beginning and trailing edge of the wave. Notice, in the example of FIG. 9, that there is greater variance in when a PDU (or PDU burst) arrives than in the length of the burst. The right side of FIG. 9 shows the representation on the left side translated into a probability space.

Figure 10:
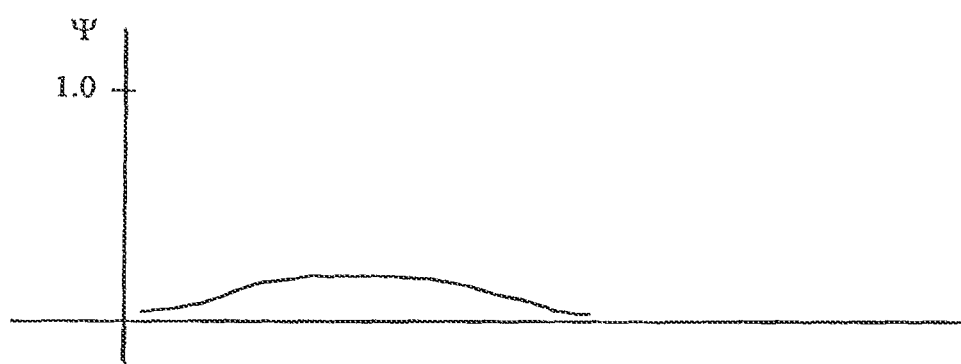
FIG. 10 illustrates the probability wave for a typical Telnet session.

Telnet Example Again using the foregoing examples, the probability wave for a Telnet session might be a relatively flat waveform reflecting the high variance in the "think time" between requests. As shown in the time vs. probability of traffic graph of FIG. 10, the waveform for the response would be longer and more rounded, reflecting the longer length of the response and less variance in the processing and round trip time.

In Telnet, there is a large variance in the periodicity and length of the bursts of traffic. A Telnet session would result in long low probability waves, implying that many Telnet sessions might be multiplexed together without causing congestion. However, the combination of many waveforms of this sort would still lead to a low probability density and low utilization. As this waveform moves through a network, the nature of the waveform will be little affected by queuing delays or congestion because the waveform already has so much uncertainty provided by the application (and the user). Although there is great variation, every request/response style application will have its own characteristic pattern.

Figure 11:
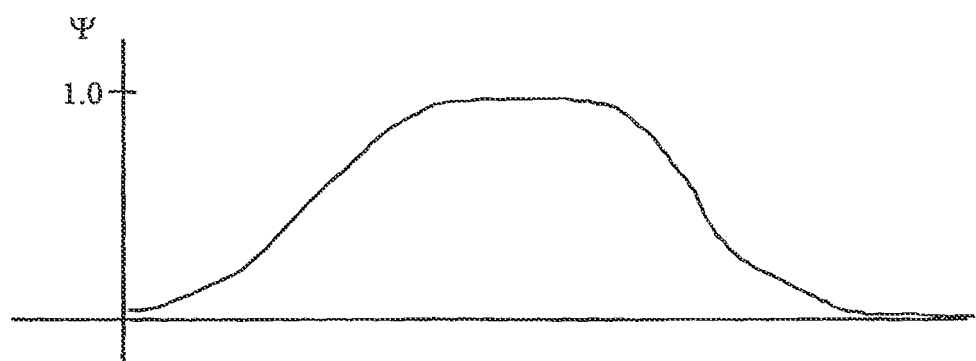
FIG. 11 illustrates the probability wave for a typical file transfer.

FTP Example: Referring now to FIG. 11, an FTP session would have a higher, much more rounded waveform, reflecting the longer PDU bursts and less variance caused by disk accesses, OS overhead and queuing delays. Once a burst starts there is a high probability that it will continue for some period and then trail off, depending on the distribution of length of bursts, as shown in the time vs. probability of traffic graph of FIG. 11. One would expect the error control protocol flow control to be the determining factor of the wavelength (burst length). The Applicant has discovered that this would result in a much different waveform that exhibits much less variability. Even so, this will lead to a wave with a slight slope at the beginning (much steeper than in the Telnet example above), reflecting the lower variation of when a burst starts. This would be followed by a low uncertainty body reflecting the lack of variation between PDUs; and finally, a steeper slope concluding the wave, reflecting lower variation in the length of the burst—i.e., a somewhat ragged square wave. The sending process is generating bursts fairly regularly, i.e. read from disk, write to the Internet, repeat until EOF (end of file). This might be continuous if it were not for the effects of flow control.

The effect of the network queuing delays and congestion will be more significant on an FTP waveform because it exhibits a fair amount of periodicity ab initio. Referring now to FIG. 12, a waveform of this type will tend to have the squareness of the wave "frayed," squaring up the leading edge by the delay, but little effect on the trailing edge, and not affecting the wavelength.

Figure 13:
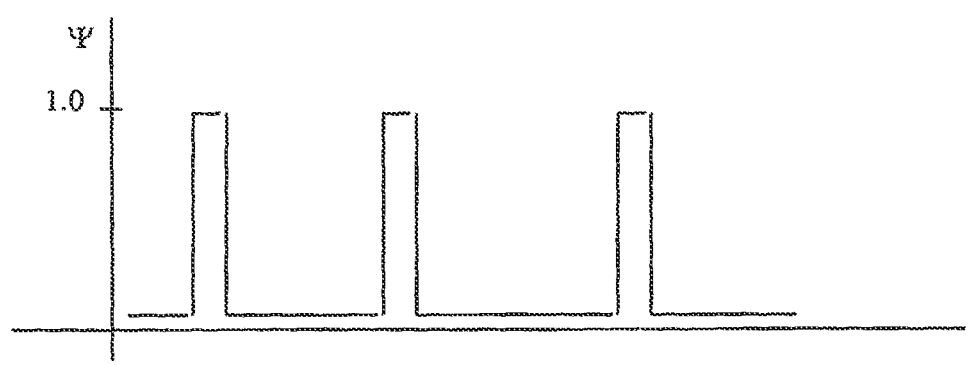
FIG. 13 illustrates the probability wave for a typical voice connection.

Voice Example: Referring now to the time vs. probability of traffic graph of FIG. 13, a voice flow would be characterized by a square wave, with a wavelength determined by the bandwidth of the connection relative to the sampling rate and the compression algorithm.

A voice flow would generate a waveform that is very close to a square wave, with a burst of PDUs occurring at highly regular intervals. The Applicant has discovered that as the waveform moves through a network, it will be "frayed" by switching delays: the wave will be become more rounded and the peak lowered proportionally. The difference between the original waveform and this "frayed" version at the destination is what is called "jitter."

The Applicant has also discovered that the applications described here by way of example are representative of the kinds of waveforms all applications will generate. The parameters of the waveforms for different applications will differ somewhat, but the approach will be the same. In accordance with the invention, as higher layer waveforms (those nearer the applications) within the network are combined, the traffic density increases and the flow control of the lower layers will dominate the traffic characteristics and the nature of the waveform. In other words, the traffic waveform of the lower layers will become independent of the applications and more dependent on the characteristics of the network itself. Furthermore, this in turn will exert pressure on applications to conform to the characteristics of the lower layer to optimize their own performance.

By way of example, this approach, including the appropriate combining of waveforms, solves a problem with current Web-related traffic referred to as the "Elephants and Mice" problem. Currently in the Internet, Web traffic generates large numbers of very short duration TCP connections that send small amounts of data. These are the "mice". Much longer duration connections such as file transfers and the like, the "elephants", are forced into behaving "fairly" by conventional congestion avoidance and flow control schemes. However, each of the mice does not generate sufficient traffic to be affected by the congestion avoidance or flow control algorithms. Nonetheless, their total, collective volume is sufficiently great that they usurp more than their share of bandwidth. Using the method of the present invention, however, the mice would be aggregated on to a lower layer flow, which would generate sufficient traffic on a longer duration intermediate flow that would impose flow control, thus imposing fairness and giving the elephants their fair share.

5. Multiplexing Methods and Systems

5.1. Introduction

By characterizing network traffic as a probability wave in accordance with the present invention, methods and systems of multiplexing can be created, as will next be described. Based on the wave characterization, one practice of the invention provides that the goal of multiplexing should be to combine waveforms (traffic flows) to more nearly approximate a square wave. In other words, to construct waveforms such that it is more certain when there will be traffic—because if one knows when (or where) there is traffic then one knows where there is no traffic. At the same time, another goal is to maintain the probability of traffic less than 1, since a probability greater than 1 would indicate congestion. (In point of fact it indicates congestion only if there is no buffering in the node. In some switch/router technologies this may, in fact, be the case. But in most, it can be viewed as an indication of the "pressure" this wave is exerting on the buffering and a more complex characterization of the congestion would be required.)

Where there is a very low probability of traffic, it will be possible to multiplex traffic from converging flows with little probability of congestion. There are many ways, using known techniques, that these waveforms can be shaped. For example, low probability waves, like those of a Telnet session, can be added together to create a waveform that is still less than the bandwidth of the channel. Slight phase shifts to add waves would create a resulting wave with a somewhat longer wavelength.

5.2. Fundamentals

If a channel has bandwidth B, then the flow described by P(t) will consume BP(t) over the period w/2. Other flows may be multiplexed in phase with this flow on the same channel as long as the sum of the probability waves is less than the congestion factor:

$$B' = \Sigma BP_i(t) \leq B(1-\epsilon)$$

where $\epsilon$ is the congestion factor.

The load can be given by L=B'/B. The factor, $\epsilon$, is a policy parameter that measures how close to full capacity the channel is to be loaded. In essence, $\epsilon$ is the probability of congestion. Negative values of $\epsilon$ indicate overbooking. This equation is still a function of probabilities. Actual traffic could still cause instantaneous congestion and still be within expectations.

The number of bits in a burst is given by:

$$\Sigma B \sin(\omega t + \Phi) dt$$

$$0 \leq t \leq p.$$

This model, in accordance with the invention, uses the absolute value of the waveform. When adding waveforms, negative values have no meaning in this environment. Consequently, when multiplexing, there is no cancellation, only superposition. While this constrains the ability to shape the wave, it does not constrain the ability to describe a waveform. In addition, there are other mechanisms that can be used to modify the waveform as appropriate.

In accordance with the invention, small delays can be used to "square up" a waveform, by forcing bunching of the PDUs. Since the same delay can be applied to each burst, the wavelength is not affected. What is provided here is a more comprehensive approach to not only shaping traffic but determining what traffic should be combined. This approach provides a useful tool and methodology for considering bursty traffic analytically.

A number of issues merit additional consideration. In particular, given the use of probability waves, a flow with high variance will have a waveform that is low and spread out. This may encourage adding more waves to create a higher probability of traffic. However, there is a finite probability that PDUs of several waves will occur at the same time, consuming the bandwidth of the channel for the length of the PDU or train of PDUs. If 2 or more waves have been combined, then there is a finite probability that 2 or more PDUs will arrive at the same time. This is not necessarily as problematic as it may at first appear. Such "collisions" do not actually occur on the wire. They occur in the device when multiplexing for the next hop. At that point, a number of options can be utilized, in particular, delaying one packet and queuing it behind the other. For some flows, this does not present a problem. A low slope flow already has a high variance, and thus it is likely that a little more variance will not matter. It is significant for delay-sensitive flows. But once flows are combined, the individual characteristics are lost. Accordingly, either flows of similar type should be aggregated, or some indication in the PDU should exist or be provided, so the multiplexing function can "know" which packet gets priority.

Figure 14:
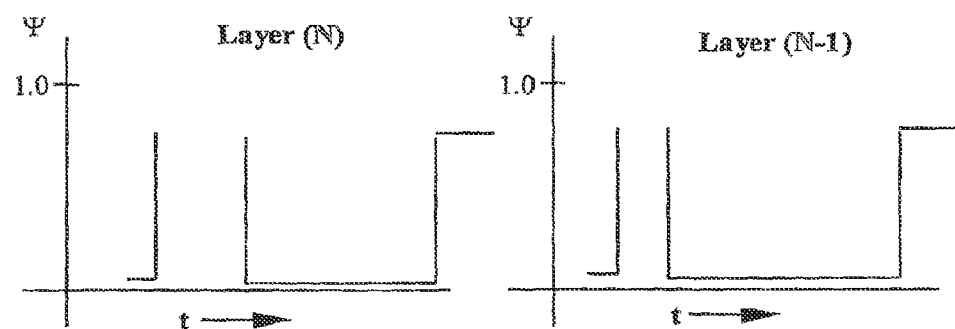
FIG. 14 shows that when a probability wave is multiplexed to a lower layer with twice the bandwidth, it arithmetically scales the wave and does not alter the wavelength.

Arithmetic Scaling Multiplexing traffic to a higher bandwidth lower layer has the effect of arithmetically scaling the waveform, as one can discern from the time vs. probability of traffic graph of FIG. 14. In the example of FIG. 14, the higher layer supports half the bandwidth of the lower layer. Hence a burst of traffic from the higher layer will be transmitted in half the time in the lower layer. This compresses it in time, creating time for more traffic. For example, multiplexing a waveform of duration d/2 and bandwidth B onto a channel of 2B bandwidth, the waveform will only occupy d/4, but the wavelength will remain d.

It is typical of many computer systems that pooled buffers for multiple resources are recommended over statically allocated buffers. The probability of buffer overflow, i.e. congestion, is much lower when buffers for all flows are pooled, rather than statically allocated. This conventionally-known result was originally derived from analyzing terminal traffic in timesharing systems (i.e., not modern networked systems).

The effects of bursty network traffic on pooled buffers, however, can adversely affect traffic.

The Applicant has discovered that so long as there is low buffer utilization, no problem is presented. The flows behave as if they were independent, since there is no competition for buffers. But high buffer utilization would manifest itself by constricting traffic on one flow in response to bursts on another flow in the shared pool. This would cause fluctuations in the wavelength of the affected flows. Given the large number of such flows that might be sharing the buffer pool, this would cause seemingly random fluctuations in the wavelength, causing peaks to coincide that were not intended to, resulting in severe congestion in the network. This would also contribute to making the traffic appear chaotic. Buffers in networks are analogous to capacitance in electronic circuitry. Hence, pooled buffers are analogous to a random varying capacitor in the network. Instead, statically allocating buffers to flows would result in much more consistent and predictable behavior. In such a system, the flow control policy can maintain a more regular periodicity using buffers to compensate for variations in application behavior and lengthening RTT. Hence, in one practice of the invention, delay-sensitive flows have statically allocated buffer pools, while delay-insensitive flows can be assigned to a pooled buffer scheme.

Beat Frequencies: The Applicant has also discovered that traffic flows to be multiplexed together should have the same wavelength or be a harmonic of the same wavelength; otherwise there will be beat frequencies on the flow that will greatly increase the probability of congestion (or require the flow to be over-provisioned to accommodate the beats). Thus, a system constructed in accordance with the invention preferably puts flows with the same harmonics on the same lower layer flow, so as to avoid the possibility of congestion being greatly increased. This also presents an issue of how to create flows on the same medium (e.g., the same wire) with different fundamental wavelengths, i.e. relatively prime.

Imposing flows with relatively prime wavelengths at a higher layer and keeping them from either interfering when multiplexed at a lower layer (ultimately on the physical medium) at first glance would appear to be a challenging problem with conventional router or switch architectures. However, one solution is to postpone combining such incompatible flows until traffic densities are sufficiently high, i.e. nearly constant, that a lower layer can impose a common wavelength. (This may in some cases cause some PDUs to incur significant delay relative to their QoS requirements.) However, subnets in the periphery of a network may not reach sufficient traffic densities to be able to utilize this tack. In a worst case scenario, a network may have densities sufficiently large that multiplexing such flows cannot accommodate the beats, but not high enough to create a constant flow. In these cases, multiplex different wavelengths at a lower layer may in such cases incur a loss in utilization, since wavelengths will have to be left "room" to accommodate beats.

Figure 2:
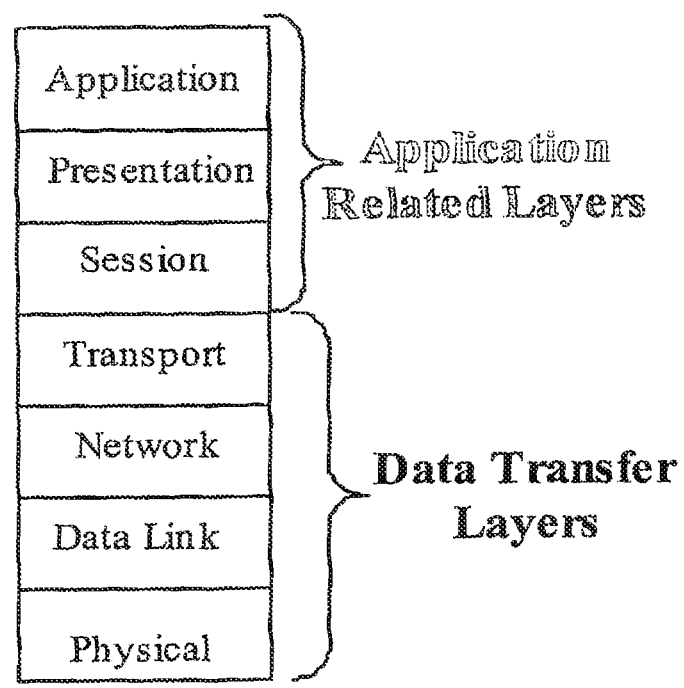
FIG. 2 is a schematic diagram illustrating the conventional layered model of networks with data transfer layers and application-related layers.

As one proceeds down in the layers and in toward the backbone of a conventional network like that shown in FIG. 1, traffic density increases. Not only does this mean that switches are more likely to always have something to send, but it also means that traffic is more likely to have common sub-paths. This yields an opportunity for concatenating more than one (N+1)-PDUs in a (N)-PDU to decrease switching overhead, with the proviso that these internal flows in deeper layers become major internal flows. When a PDU must be demultiplexed at an intermediate node to be put on a different internal flow for the next segment of its route, it will incur some delay in this operation as it is matched (queued) to the wave characteristics of the other flow. This is not necessarily undesirable, since by being multiplexed in the previous flow the PDU effectively encountered less delay as it went through the various nodes that made up that segment of its path. Not only is the switch able to handle the flow more efficiently because it "knows" what to do with it, but also by concatenating PDUs, the delay at each switch in the (N)-path can be amortized over the number of (N+1)-PDUs in the (N)-PDU.

On the one hand, it is not so much a question of leaving a gap as generating an interval when there is high probability of no traffic, so that additional traffic can be multiplexed (or merged) from other links without causing congestion. In a conventional network like that shown in FIG. 1, the gaps provide an opportunity for merging traffic to be multiplexed onto the channel at subsequent nodes. If flow control converged to a constant flow, i.e. $P(t)=1$ for all t, then any traffic from other network links would cause congestion. The only point at which such gaps may not be useful is on links to terminal nodes.

5.3. Waves in TCP

In the original design of TCP, flow control was intended as a means of managing the buffers in the receiving host, to prevent the sender from sending faster than the receiver could consume the PDUs. As networks (particularly the Internet) grew, it became apparent that if there was no congestion control anywhere, the Internet would (and did) become non-functional. It was determined, partly to maintain the connectionless model and the understanding of the end-to-end principle, that congestion avoidance should be added to TCP, not only to respond to congestion but also ensure fairness among competing TCP connections.

Hence in conventional networks, the transport layer generally and TCP in particular have been co-opted to provide flow control not only between the end points of its flow, but also to respond to apparent congestion anywhere along the path taken by the flow. In other words, transport has been made responsible for managing resources that belong to another entity. The network is given little or no ability to manage its own resources. The congestion at these intermediate points is affected by traffic from other nodes and may move from one node to another in the path encountered by a TCP flow. All of these conditions will cause the wavelength of the TCP flow to change erratically, and in this light, network traffic has been described by those skilled in the art as appearing fractal or chaotic.

Figure 15:
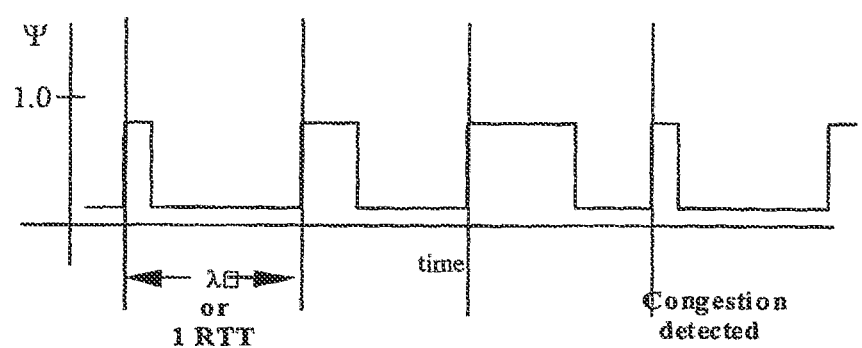
FIG. 15 is a graph illustrating the behavior of TCP flow control in more detail.

In particular, the basics of the conventional TCP congestion avoidance algorithm are as follows: the sender starts with a small window of 1 segment as long as it is ack'ed (acknowledged), the sender doubles the send window until it reaches a threshold discovered by the most recent congestion detection. After that, it increases the amount it sends in every burst by 1 segment. There is thus an exponential increase to a threshold and then a linear increase until congestion is detected; at which point, the sender resets the send window to 1 segment and sets the congestion threshold and starts again. Several conditions are used by the sender to detect congestion on the path. In accordance with the wave-based model of the present invention, the wave pattern associated with this is shown in the time vs. traffic graph of FIG. 15.

This conventional algorithm is sub-optimal in a number of ways. First, the conventional algorithm is not per se congestion avoidance, but rather a congestion generator that attempts to grab as many resources for itself as it can. Second, when congestion occurs on the path to the receiver, the information must flow to the receiver and back to the sender. This introduces a considerable hysteresis in the response. In fact, the condition may no longer exist by the time the sender detects the congestion. (The higher the bandwidth, the more pronounced the effect and the greater the amount of data affected, i.e. lost and re-transmitted.) Third, every TCP connection with PDUs going through the congestion point will receive the same indications and all will back off (probably at widely disparate times). While this relieves the congestion, it probably also leaves the node where the congestion occurred suddenly under-utilized. All of these are problems inherent to any attempt to respond to congestion far removed from its source, using the conventional approach.

5.4. Characterizing Isochronous Traffic in Accordance with the Invention

Figure 16:
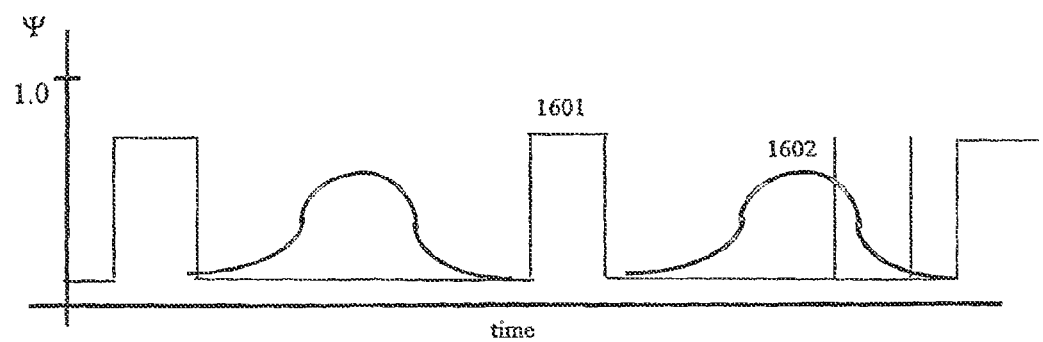
FIG. 16 is a graph illustrating multiplexing of voice and data flows, in which the uncertainty in the data flows (indicated by the lower slope of the leading and trailing edge of the curves) when combined with the highly regular voice traffic implies that lower bandwidth utilization should be allowed to avoid congestion.

Referring now to FIG. 16, the techniques of the invention described herein can also be used to characterize isochronous traffic. If one had a source (an application or a node)

that generates fixed length bursts of traffic at precisely fixed intervals, it would generate a step function waveform. In other words, $$P(t)=\{1, \text{ if } 0 \le t \le \pi; \ 0, \pi \le t \le 2\pi\}$$

Those skilled in the art will see that attempting to multiplex this waveform with another waveform of the same wavelength but greater variance, without generating congestion, will be extremely difficult.

Unlike data, voice at its source is a constant. Typically, the voice stream is digitized by sampling at a rate of 2B and then compression is added. This yields a flow with bandwidth B with a waveform that is very close to a square wave. The sampling and the compression create the bursts. This is, in essence, what happens on a T1 line where the period is 24 and it is multiplexed with 23 other voice flows. Video will generate a similar waveform but at a higher bandwidth. The requirement of isochronous traffic is that these bursts move through the network with little perturbation of their relative separation, i.e. little spreading of the square wave.

An isochronous flow is a mixed blessing. On the one hand, its high certainty means that time between the gaps is highly certain and therefore it is an opportunity to multiplex it with other flows. On the other hand, its certainty and intolerance of perturbation makes it difficult to multiplex anything with it other than similar traffic. Any attempt to multiplex normal data traffic with isochronous traffic requires that the wave representing the data not overlap or overlap very little with the isochronous waveform, or the probability of congestion becomes very high. Multiplexing typical data traffic with isochronous traffic will result in low network utilization (see, e.g., FIG. 16).

Not all low variance, highly periodic waveforms require low jitter. For example, a telemetry source might generate traffic at precise intervals but not require low jitter, only low delay, and perhaps not even that. However, all flows with strong jitter constraints will have low uncertainty waveforms.

There are several conclusions that can be drawn from this. For example, data traffic will in many cases not achieve the utilization levels of isochronous traffic, unless traffic density is high and delay and/or jitter are not tightly constrained. This does not mean that it is never advantageous to mix isochronous and asynchronous traffic. There may be data traffic flows which sufficiently resemble isochronous flows to be effectively combined. One place this is likely to occur is in or near the backbone of a large network where the law of large numbers becomes dominant and the data traffic can be formed into a wave that looks (and therefore is) isochronous. In other words, if there are high traffic densities to the point that there is always traffic to send, it can be made to have any waveform.

6. Operating Regions and QoS Parameters

Another aspect of the present invention relates to operating regions and associated QoS parameters. In one practice of the invention, an operating region is defined for each layer and for each network element. The operating region for a network element is determined to a large degree by the characteristics of the equipment. Layers intersect these operating regions, further subdividing them by ranges of bandwidth. Each layer supports a particular range of bandwidth. Flows within that layer support particular ranges of QoS determined by the other QoS parameters, such as delay and jitter. Operating regions may be defined to accommodate consistent sets of users of the layer.

Each application will provide a set of QoS parameters along with the tolerances for each Allocation it requests. These can be considered to define a small hypercube. This hypercube is allocated to one of the larger cubes defined by the operating regions. All flows within a single operating region are treated the same. The task of the layer is to accommodate requests for QoS and match them to the appropriate operating regions. The task of the layer is to multiplex these on flows to maximize utilization while avoiding congestion that would degrade QoS. Since one is still working with probability functions, congestion can still occur even if max P(t)<1.

As a general matter, QoS parameters are either idempotent or cumulative, i.e. they are a given or contribute to a final value. Bandwidth-related parameters are idempotent; delay-related parameters are cumulative. More particularly, idempotent parameters are constraints which are always of the form p<X at any point in the path. Cumulative parameters on the other hand are of the form p= p.sub.1+ . . . +p.sub.n<X for all nodes on the path. So for example, delay is cumulative, whereas the bandwidth used is always the same.

The QoS parameter of each segment of a path must be either matched to those requested, i.e. less than or equal, or contribute to the final value, i.e. the sum is less than some value.

It is an important technical advantage of the invention that all Operating Region and QoS parameters can be expressed in terms of properties of the wave function. What's more, these parameters are even directly derivable from the waveform itself. Flow characteristics are of two fundamental types: properties of the waveform itself, e.g. bandwidth, wavelength, BP(t), jitter, etc., and special characteristics of the flow, e.g. delay.

Let traffic be modeled by:

$$F(t) = B \sin(\omega t + \Phi)$$

where
B=bandwidth of the channel
ω=wavelength
Φ=phase
Then $$\text{Average } B/W = \Sigma B \sin(\omega t + \Phi) dt/Dt \ 0 \le t \le 2\tau$$

$$\text{Peak } B/W = d \ B \sin(\omega t + \Phi)/dt = 0$$

Bandwidth and wavelength are natural properties of the network, i.e., they cannot be modified at allocation time. Wavelength is primarily a property of the amount of buffering (or elasticity) in the node.

Figure 17:
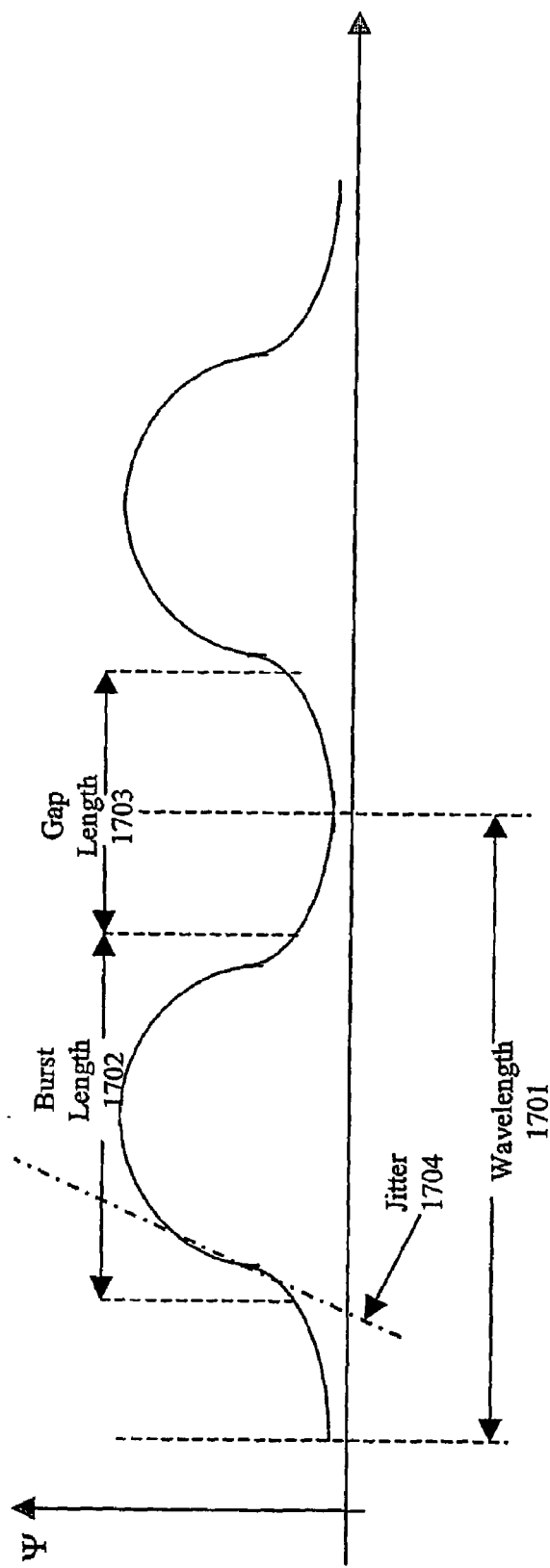
FIG. 17 is a graph illustrating how many QoS parameters can be expressed as properties of the waveform, in which bandwidth is the area under the curve divided by the period, and jitter is an inverse function of the slope of the leading edge of the curve.

Referring now to FIG. 17, delay and jitter are functions of the path and the degree of success at avoiding delay, i.e., more than expected queuing delays. Delay affects the shape of the wave, i.e., variations in inter-arrival time.

Jitter is a measure of the effects of delay relative to adjacent bursts, i.e. the variance of delay. It affects the shape of the wave, tending to round and spread it. As noted in FIG. 17, it can be measured as the inverse of the slope of the leading edge of the wave. The corresponding square wave is a square wave with the same area under the curve with a maximum of P(t)=1.

As a general matter, an application requests certain QoS parameters and tolerances and then will exhibit a certain behavior. In other words, it proposes a certain waveform, but may exhibit a different one. PDUs being multiplexed from the layer above will be encapsulated in an (N)-PDU. Any PCI in an (N+1)-PDU indicating its QoS requirements will be subsumed by the (N)-PDU. Hence, QoS parameters for the encapsulated flows should be a subset of the encapsulating flow. If not, then these should multiplexed to different flows.

In accordance with the invention, by expressing all QoS parameters as properties of the waveform, there is a consistent set of parameters that can be used to engineer a network. The parameters of the waveform are orthogonal, and those skilled in the art will appreciate that various methods can be used to manipulate them (see, for example, FIG. 17).

7. Using Operating Regions and Multiplexing

In accordance with the invention, the use of error control protocols for flow control between the entry and exit points of a subnet can result in much less hysteresis and much more direct response to congestion at the point at which it occurs. It can also put the resources of the network under the control of the network and not under the chaotic control of thousands of uncoordinated applications or hosts.

Layers: In one practice of the invention, a layer can operate over a subnet. The flows would operate connectionless across the subnet, with flow control only at the entry and exit points. The layer above provides connectionless routing, with the flows of the layer below being the arcs of the network for the layers above. This configuration maintains the advantages of connectionless routing at each layer of the network. Hence, this configuration maintains the resiliency of connectionless within the subnet, with the control needed at its edges. More formally, (N)-subnet traffic is routed within the subnet using traditional connectionless routing techniques. The (N)-error control protocol in this layer is used to provide flow control between the entry and exit points of the (N)-subnet regardless of whether for transit or to an end system. These (N)-flows become the arcs that compose the (N)-network seen by the (N+1)-layer, which does the same thing. Similarly, the arcs that constitute the routes for the (N)-subnet may actually be (N−1)-flows across (N−1)-subnets. Eventually, the (N−1)-subnet is congruent with the individual physical media that make up the network.

The buffering and round trip time (RTT) for the error control protocol across the subnet will determine the wavelength of flows at that layer. The error control mechanisms would not be used unless the error characteristics of the layer below required it to maintain the effectiveness of error control at the (N+1)-layer or above. Since this is a lower layer flow, it would be an aggregate of flows at the layer above. This will put constraints on the upper flows, and also provide them with a stable base.

In accordance with the invention, this approach enables congestion avoidance policies to be moved from the source (as in conventional network practice) to where the congestion occurs, while retaining the advantages of connectionless networks, thus providing an opportunity to actually avoid congestion. Actually being able to avoid congestion can greatly improve not only the efficiency of the network, by removing much of the retransmission traffic, but also improve the ability to provide QoS to applications by making the behavior of the network more predictable. The same congestion avoidance policy could be used with TCP.

Flow Control: The primary purpose of flow control in error control protocols is to keep the sender from overrunning the receiver. Buffering at the receiver provides some decoupling and hence protection against bursts causing congestion. If there were no bursts, then PDUs would arrive at constant rate, be processed, queued for forwarding, and queue lengths could be kept short(er). The flow control in an error control protocol is intended to moderate buffer utilization between the end points of the flow. The buffers at the receiver act as capacitance in the flow. It is the amount of buffering and the RTT that are the primary factors in determining the wavelength of the flow.

In practice, most of the waveforms for most of the flows will be determined by the flow control of the error control protocols. These will dominate the traffic. Network architects should thus evaluate only waveforms generated by applications at the edges to ensure that early multiplexing decisions are made correctly. Even then it is not the application per se, but the waveform of the flows the applications create. Some of those flows will be so short-lived as to be unaffected by flow control of the layer supporting the application. These will be picked up by the flow control of lower layers. Thus, only those long-lived flows will be of concern. Several methods can be used to detect the waveform. The application may provide a prediction, which can then be used to seed observations by the layer mechanisms. In particular, one is trying to detect a pattern in inter-arrival time in a one-dimensional stream of PDUs. Many well-known statistical methods can be used to generate the probability wave from the PDU inter-arrivals. Neural nets can be applicable to the problem as well, and there will be considerable pressure on the applications to conform to the wave characteristics of the supporting layer. (Those skilled in the art will appreciate that an application will be supported by a layer that has the appropriate scope and bandwidth range for the requirements of that application. Not all applications will be supported by the same layer.)

Current TCP policies call for an application to take all of the bandwidth/resources that it can get. This conventional approach has both advantages and disadvantages. On the one hand, one might argue that if the resources are available, why not use them? It is intended to get the users' traffic out of the network as soon as possible and makes the network available for other users. On the other hand, as the load on the net increases, the performance seen by the user has nowhere to go but down. How this is solved is largely a matter of policy and both can be supported with this approach. However, the important property that the network should maintain is the characteristic wavelength. Buffering can be used in some nodes to create the appropriate wavelength, i.e. make it longer by imposing delay. This may imply statically allocating resources to flows and letting the user get all that he can within those constraints, or equally allocating resources to all flows and reducing them equally as more flows are allocated up to some maximum. For some operating regions, it will be necessary to allocate resources and impose special treatment of the traffic to ensure that the QoS constraints are met, such as ensuring delay or jitter, while other flows will belong to looser operating regions where they will utilize what they can with what is left.

Connecting subnets or "peering" may require a certain amount of impedance matching between flows in different subnets. Impedance matching is usually done by adding capacitance to the line and one could expect that additional buffering would be required here as well.

These forms of recursive feedback processes are well understood in process control systems, and once in place are quite stable. In the case of networks, the law of large numbers takes over as one moves down and in, masking any erratic behavior by the users, and hence leading to very stable, long lived flows forming a basis of the network.

8. Algorithmic Practices of the Invention

Figure 18:
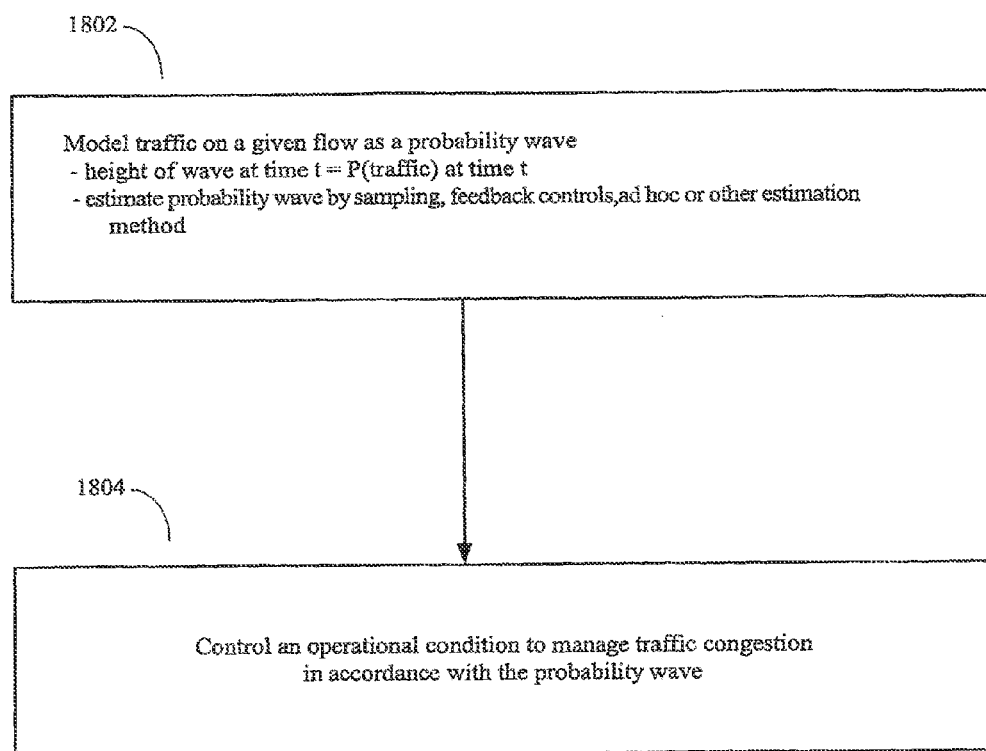
FIGS. 18 and 19 are flowcharts illustrating algorithmic practices of the invention.
Figure 19:
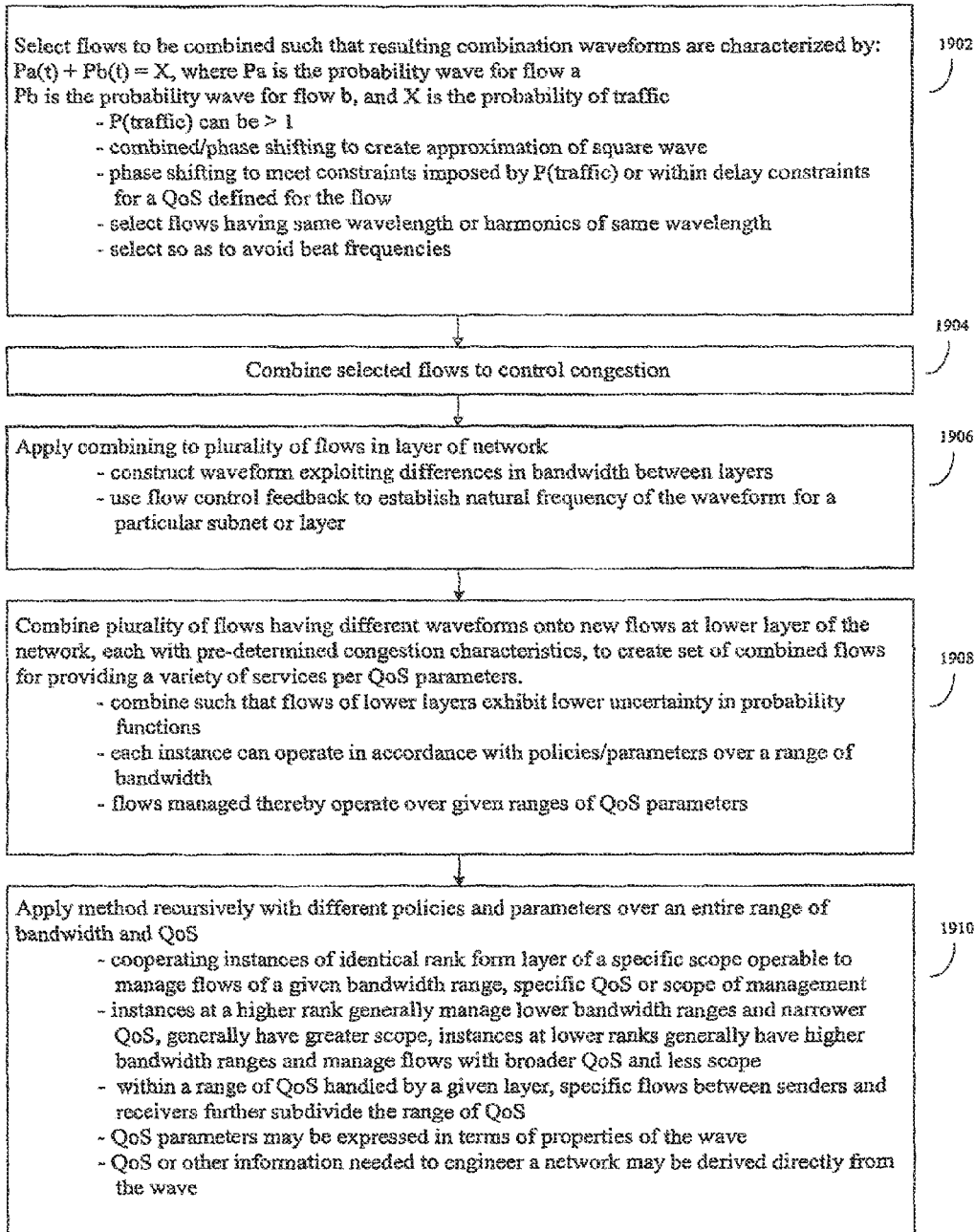

FIGS. 18 and 19 are flowcharts illustrating algorithmic practices of the invention. As shown therein, an overall method of managing traffic congestion in a network can comprise modeling traffic on a given flow as a probability wave (1802), wherein the height of the wave at time t is equal to the probability of traffic, P(t) at time t, and controlling an operational condition of the network to manage traffic congestion in accordance with the probability wave (1804). The probability wave can be estimated in accordance with a selected estimation method, such as ad hoc determination, sampling, feedback controls, or other known estimation method.

The method can also comprise combining selected flows to control congestion (1902, 1904), and selecting the flows to be combined such that the resulting combination waveforms are characterized by a relation Pa(t)+Pb(t)=X, where Pa is the probability wave for flow a, Pb is the probability wave for flow b, and X is the probability of traffic (1902). As discussed above, the probability of traffic can be greater than 1, corresponding to a defined overbooking level.

More particularly, as described above, in a useful practice of the invention, the probability waves are combined to create an approximation of a square wave (1902). The combining can include: phase shifting a selected wave to meet constraints imposed by the probability of traffic and to better approximate a square wave; selecting flows to be combined having the same wavelength or harmonics of the same wavelength; and selecting flows to be combined so as to avoid beat frequencies. The phase shifting aspect can include phase shifting a selected wave within delay constraints for a QoS defined for the respective flow.

As described above, a further practice of the invention can include applying the combining to a plurality of flows in a given layer of a network (1906), including constructing a waveform that exploits differences in bandwidth between different layers. Flow control feedback can be used to establish the natural frequency of the waveform for a particular subnet or layer. As noted above, in accordance with the invention, the waveform arithmetically scales as a function of differences in bandwidth between different layers.

A further practice of the invention, as noted above, can include combining a plurality of flows having different waveforms onto new flows at a lower layer of the network, each with pre-determined congestion characteristics, to create a set of combined flows for providing a variety of services in accordance with selected QoS parameters (1908). The combining may be executed such that the flows of lower layers in the network exhibit lower uncertainty in their probability functions. Each instance can operate in accordance with a set of policies and parameters over a given range of bandwidth, and flows managed thereby operate over given ranges of QoS parameters, such that the method can be applied recursively with different policies and parameters over an entire range of bandwidth and QoS (1910). In one practice of the invention, cooperating instances of identical rank form a layer of a specific scope operable to manage flows of a given bandwidth range, specific QoS or scope of management. Instances at a higher rank generally manage lower bandwidth ranges and narrower QoS, and generally have greater scope, and instances at lower ranks generally have higher bandwidth ranges and manage flows with broader QoS and less scope. Within a range of QoS handled by a given layer, specific flows between senders and receivers further subdivide the range of QoS (1910).

Perhaps most significantly, QoS parameters can be expressed in terms of properties of the wave, and QoS or other information needed to engineer a network may be derived directly from the wave (1910).

9. Technical Advantages

From the preceding description, taken together with the accompanying drawing figures, it will be appreciated that the present invention provides a number of technical advantages over conventional congestion control algorithms, methods and systems. Significant advantages, for example, relate to scaling, QoS, and network management.

A. Scaling

Scalability is perhaps the most significant problem facing networking today. Conventional networking with one layer does not scale, nor does any architecture with different, handcrafted protocols in two, three, four, or even seven layers. The present invention, however, provides substantial improvements in scaling over distance, numbers of nodes, and ranges of bandwidth. In particular, the invention can provide scaling because a system constructed in accordance with the invention can be composed of a small number of repeatable elements. Each new problem does not require new concepts or implementations, but instead can be built efficiently and effectively from a small set of concepts.

B. Quality of Service

The present invention supports a general approach to strong QoS that is not available under existing methods, and can be applied to any application. The ability to change policy on the data transfer protocols allows much greater tailoring of flows and thus provides some classes of QoS. The approach to multiplexing described herein also allows a much more analytical approach to QoS that can reduce congestion and increase capacity utilization. In addition, the aggregation of traffic can significantly decrease switching loads on processors. Finally, multiple levels of QoS enable broad penetration of time-sensitive applications such as Voice over IP (VoIP) and streaming video.

C. Network Management

Because conventional networks are composed of individually specified protocols with few commonalities, conventional network management is unable to make significant assumptions about the common characteristics and behavior of objects under management. This renders the impact of management actions less predictable. It also results in a proliferation of expensive, custom, "hand-made" management solutions. In accordance with the present invention, however, simpler, more common management information is possible, making management activities more regular and tractable over a broader range of management assumptions. This commonality alone creates an immense simplification in network management systems and the operations of networks, thus requiring far fewer expert personnel. The scope of devices under management is also more effectively partitioned, again simplifying management.

The foregoing embodiments and practices are described solely by way example, and are not intended to limit the scope of the invention. Those skilled in the art will appreciate that numerous variations and modifications of the foregoing examples are possible and within the scope of the invention, which is limited solely by the appended claims.

What is claimed is:

1. A method for managing traffic congestion in a network, the method comprising:

obtaining parameters of the network at a network management server;

modeling traffic for a group of flows in the network based on the parameters to generate a model of the traffic including model flows, the modeling being performed by the network management server;

controlling an operational condition of the network to manage the traffic congestion in accordance with the model by generating traffic instructions at the network management server for combining selected flows of the group of flows based on the model flows, a probability of traffic, available bandwidth and a predicted bandwidth, and based on a congestion factor, wherein the congestion factor is a policy parameter for how close to full capacity a channel is to be loaded; and adding priority information into the selected flows to indicate a priority of transmitting to be followed by network devices, wherein the priority information causes a network device to delay transmission of a first packet from a combined traffic flow and causes the network device to queue the first packet behind a second packet of the combined traffic flow.

2. The method of claim 1, comprising reducing packet processing overhead by reducing a number of packets having control information to be analyzed, wherein reducing of the packet processing overhead includes aggregating independent packets of the group of flows during the combining of the selected flows, wherein the modeling of the traffic is based on utilizing Fourier transforms.

3. The method of claim 2, wherein the control information includes address information and quality of service information.

4. The method of claim 1, comprising transmitting the traffic instructions from the network management servers to one or more network elements for adjusting routing to combine the selected flows, wherein the selected flows are limited to a same layer of the network.

5. The method of claim 1, further comprising estimating the model flows utilizing an estimation process selected from the group consisting of ad hoc determination, sampling, feedback controls, or combinations thereof.

6. The method of claim 1, wherein the modeling of the traffic is based on probability waves, wherein a height of each of the probability waves at time t is equal to the probability of traffic, P(t) at the time t, and wherein the selected flows are chosen based on the corresponding probability waves of the selected flows when combined approximating a square wave.

7. The method of claim 6, wherein the combining of the selected flows is based on using a formula $B'=\Sigma BP_i(t) \leq B(1-\epsilon)$, where $\epsilon$ is the congestion factor, wherein a probability wave of flow i is $P_i(t)$, wherein B is the available bandwidth, and wherein B' is a predicted bandwidth.

8. The method of claim 1, further comprising:
selecting the flows to be combined such that the resulting combination waveforms are characterized by a relation Pa(t)+Pb(t)=X, where Pa is the probability wave for flow a, Pb is the probability wave for flow b, and X is the probability of traffic, wherein the probability of traffic can be greater than 1, corresponding to a defined overbooking level.

9. The method of claim 1, wherein the combining of the selected flows comprises selecting flows of the group of flows to avoid beat frequencies.

10. A server for managing traffic congestion in a network, the server comprising:
a memory storing computer instructions; and
a processor in communication with the memory, wherein the processor, responsive to executing the computer instructions performs operations comprising:
modeling traffic for a group of flows in the network based on parameters of the network to generate a model of the traffic including model flows;
generating traffic instructions to manage the traffic congestion in accordance with the model,
wherein the traffic instructions include combining selected flows of the group of flows based on the model flows, a probability of traffic, available bandwidth and a predicted bandwidth, and based on a congestion factor, wherein the congestion factor is a policy parameter for how close to full capacity a channel is to be loaded, and wherein the traffic instructions include aggregating independent packets of the group of flows during the combining of the selected flows thereby reducing packet processing overhead by reducing a number of packets having control information to be analyzed; and adding priority information into the selected flows to indicate a priority of transmitting to be followed by network devices, wherein the priority information causes a network device to delay transmission of a first packet from a combined traffic flow and causes the network device to queue the first packet behind a second packet of the combined traffic flow.

11. The server of claim 10, wherein the modeling of the traffic is based on utilizing Fourier transforms.

12. The server of claim 10, wherein the processor, responsive to executing the computer instructions performs operations comprising: transmitting the traffic instructions to one or more network elements for the combining of the selected flows and for the aggregating of the independent packets.

13. The server of claim 10, wherein the combining of the selected flows comprises selecting flows of the group of flows having a same wavelength or harmonics of the same wavelength.

14. The server of claim 10, wherein the modeling of the traffic is based on probability waves, wherein a height of each of the probability waves at time t is equal to the probability of traffic, P(t) at the time t, and wherein the selected flows are chosen based on the corresponding probability waves of the selected flows when combined approximating a square wave.

15. The server of claim 14, wherein the combining of the selected flows is based on using a formula $B'=\Sigma BP_i(t) \leq B(1-\epsilon)$, where $\epsilon$ is the congestion factor, wherein a probability wave of flow i is $P_i(t)$, wherein B is the available bandwidth, and wherein B' is a predicted bandwidth.

16. A non-transitory computer-readable storage medium comprising computer instructions, which, responsive to being executed by a processor of a network management server, cause the processor to perform operations comprising:
obtaining parameters of the network;
modeling traffic for a group of flows in the network based on the parameters to generate a model of the traffic including model flows;
controlling an operational condition of the network to manage the traffic congestion in accordance with the model by generating traffic instructions at the network management server for combining selected flows of the group of flows based on the model flows, a probability of traffic, available bandwidth and a predicted bandwidth, and based on a congestion factor, wherein the congestion factor is a policy parameter for how close to full capacity a channel is to be loaded; and
adding priority information into the selected flows to indicate a priority of transmitting to be followed by network devices, wherein the priority information causes a network device to delay transmission of a first packet from a combined traffic flow and causes the network device to queue the first packet behind a second packet of the combined traffic flow.

17. The non-transitory computer-readable storage medium of claim 16, wherein the generating of the model traffic flows is based on utilizing Fourier transforms.

18. The non-transitory computer-readable storage medium of claim 16, wherein the combining of the selected flows comprises at least one of: selecting flows of the group of flows having a same wavelength or harmonics of the same wavelength, or selecting flows of the group of flows to avoid beat frequencies.

* * * * *